Aug. 15, 1961 A. E. GLANDON 2,996,252

ANALOG MULTIPLYING CIRCUIT

Filed Aug. 22, 1958 2 Sheets-Sheet 1

ADRIAN E. GLANDON
INVENTOR.

BY R. Frank Smith
Robert W. Hampton

ATTORNEYS

ANALOG MULTIPLYING CIRCUIT

Filed Aug. 22, 1958 2 Sheets-Sheet 2

ADRIAN E. GLANDON
INVENTOR.

BY R. Frank Smith
Robert W. Hampton
ATTORNEYS

United States Patent Office 2,996,252

Patented Aug. 15, 1961

2,996,252

ANALOG MULTIPLYING CIRCUIT

Adrian E. Glandon, Cedar Rapids, Iowa, assignor to Eastman Kodak Company, Rochester, N.Y., a corporation of New Jersey Filed Aug. 22, 1958, Ser. No. 756,585

1 Claim. (Cl. 235—194)

The present invention concerns multiplying circuits and more particularly concerns analog multiplying circuits wherein a multiplying factor is adjustable both in sign and in numerical value.

Frequently there is a need for an electronic circuit capable of multiplying an input signal by a factor that is adjustable in numerical value. By means of various known circuits it is possible to multiply an input signal by a factor of fixed sign, the multiplying factor being adjustable in numerical value over a limited range. For example, a simple potentiometer may be regarded as performing the operation of multiplying by a positive factor whose numerical value is adjustable between zero and unity. If an amplifier is connected to the output of the potentiometer, it extends the range of numerical values of the multiplying factor beyond unity. Initially, the multiplying factor may be made postive or negative by using an even or odd number of amplifying stages, respectively, but its sign cannot be made selectively reversible by simple means.

It is therefore a principal object of the present invention to multiply an input signal voltage by a factor that may be set at any selected numerical value within a range bounded by positive and negative limits.

Another object is to select the numerical value of a multiplying factor, within a range bounded by positive and negative limits, by the manipulation of a single control device.

Other objects are:

To selectively adjust the relationship between input voltage level and zero output voltage in an analog multiplying circuit;

To independently and selectively adjust both the algebraic numerical value of a multiplying factor and the relationship between input voltage level and zero output voltage in an analog multiplying circuit; and To provide an improved analog multiplying circuit.

Other objects of the invention will appear from the following description, reference being made to the accompanying drawings, wherein.

The present multiplying circuit incorporates one or two operational amplifiers of the type commonly used in analog computers, and described, for example, in chapter 5, Electronic Analog Computers, by Korn and Korn, McGraw-Hill, 1952. The pertinent characteristics of each amplifier are: (1) gain may be expressed as a large negative number; (2) output impedance is relatively low, so that the amplifier may be used to provide an input signal for similar amplifiers with negligible loading of its output circuit; (3) the amplifier may be operated with a relatively large value of negative voltage feedback, sufficient to make variations in amplifier gain negligible; and (4) the amplifier frequency response extends to zero frequency, rendering the circuit useful for operating upon D.C. signals as well as upon A.C. signals in the subaudio and audio frequency ranges.

The multiplying circuit of the present invention comprises an input circuit, an output circuit and two parallel channels interconnecting the input and output circuits. The output circuit may include an operational amplifier, designated the output amplifier, which sums the signals received from the two channels. One channel applies the input signal to the output amplifier without inverting the phase of the signal. The other channel inverts the phase of the input signal, by means of another operational amplifier, for example, before applying it to the output amplifier. Thus, the output amplifier receives the input signal both inverted and uninverted in phase.

In at least one channel, there is provided a device for attenuating a manually selectable portion of the input signal. Therefore, the total signal applied to the summing amplifier can be varied both in amplitude and in phase, or algebraic sign, between limits which are determined by the parameters of the channel components. The overall output of the multiplying circuit can be expressed as the product of the input signal and a factor which is adjustable between positive and negative limits.

Figure 1:
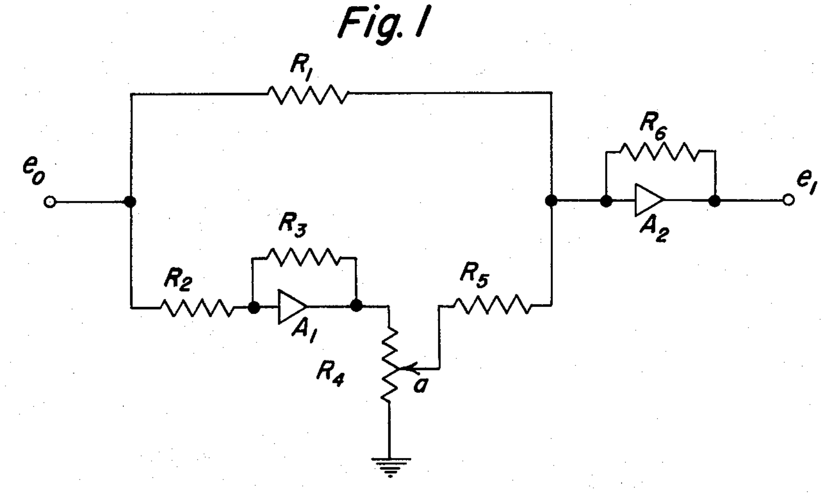
FIG. 1 is a schematic wiring diagram of a simple form of the invention.

Referring to FIG. 1, the multiplying circuit includes an input terminal designated $e_0$ to represent an input signal. Terminal $e_0$ is connected in series with a first channel comprising only a resistor $R_1$. A second channel, connected in parallel with the first channel, comprises a resistor $R_2$ in series with a phase inverter (comprising an operational amplifier $A_1$), a potentiometer $R_4$ and a resistor $R_5$. A resistor $R_3$ is in parallel with amplifier $A_1$, and its resistance value may be chosen relative to that of resistor $R_2$ to produce any desired gain in amplifier $A_1$ in a manner well known in the art, the gain being $$\frac{R_3}{R_2}$$

The two channels are joined to the input of a second amplifier $A_2$ which is connected, in parallel with a resistor $R_6$, to an output terminal designated $e_1$ to represent an output signal.

The operation of the circuit is as follows. A voltage signal applied to the input terminal $e_0$ is transmitted to the output amplifier $A_2$ through each of the two channels: (1) through resistor $R_1$, involving no phase inversion; and (2) through the channel including amplifier $A_1$, resistors $R_2$, $R_3$, $R_5$ and potentiometer $R_4$. The signal through the latter channel is inverted in phase by amplifier $A_1$, amplified by an amount determined by the values of resistors $R_2$ and $R_3$, attenuated by an amount determined by the setting of the potentiometer $R_4$ (where "$a$" is the fraction of the output signal of amplifier $A_1$ transmitted by the potentiometer), and applied through resistor $R_5$ to the input of amplifier $A_2$.

Amplifier $A_2$ performs a summing operation on the two signals applied to it through resistors $R_1$ and $R_5$, and amplifies the two signals in amounts determined by the values of resistors $R_1$, $R_5$ and $R_6$. Thus, amplifier $A_2$ receives two signals opposed in phase or polarity. The relative magnitudes of these signals depend upon the relative degrees of amplification or attenuation occurring in the two signal channels. Amplifier $A_2$ therefore produces an output signal $e_1$ related in amplitude and phase to the input signal $e_0$ in a manner depending upon the setting of the potentiometer $R_4$ and upon the values of resistors $R_1$, $R_2$, $R_3$, $R_5$ and $R_6$.

Expressed mathematically, $$e_1=\left(\frac{-R_6}{R_1}+a\frac{R_3R_6}{R_2R_5}\right)e_0 \qquad (1)$$

where $1 \gtreqless a \gtreqless 0$.

The operation of the circuit may be most clearly demonstrated by considering the special case in which equal positive and negative maximum values of the multiplying factor are desired. For that case, we choose $$R_1=R_5 \qquad (2)$$

and $$\frac{R_3}{R_2}=2 \qquad (3)$$

Then Equation 1 becomes, upon substitution of the relationships in Equations 2 and 3, $$e_1=\frac{R_6}{R_1}(2a-1)e_0 \qquad (4)$$

where $1 \gtreqless a \gtreqless 0$.

Substituting in Equation 4 some particular values for $a$, $$\text{if } a=1,\ e_1=\frac{R_6}{R_1}e_0 \qquad (5)$$

$$\text{if } a=\tfrac{1}{2},\ e_1=0 \qquad (6)$$

and $$\text{if } a=0,\ e_1=\frac{-R_6}{R_1}e_0 \qquad (7)$$

Figure 2:
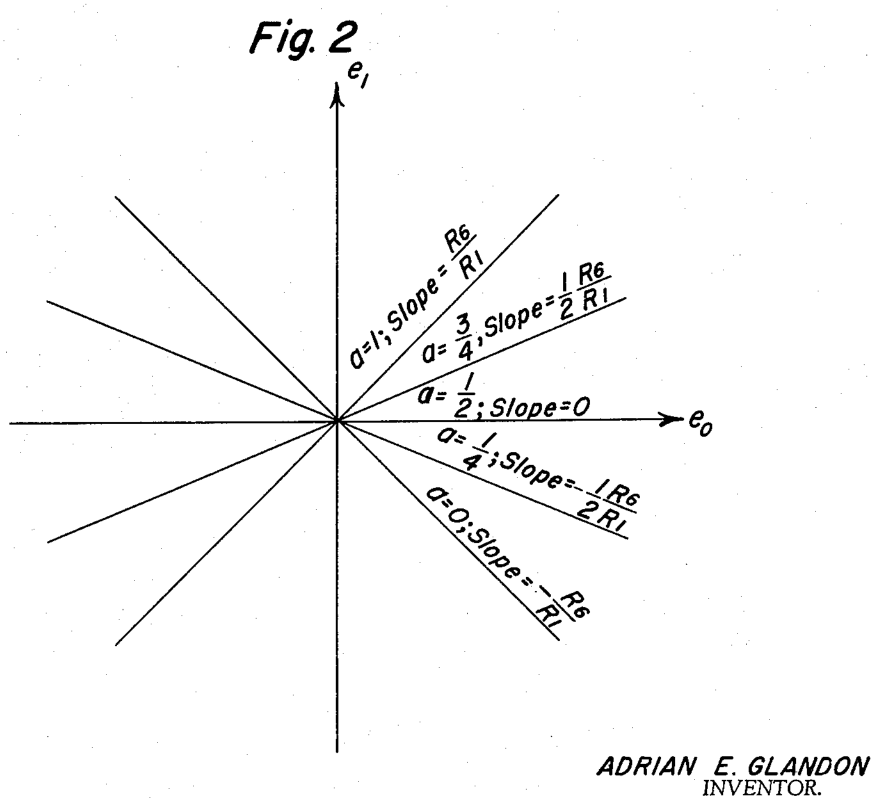
FIG. 2 is a graph illustrating the relationship between input and output voltages of the circuit shown in FIG. 1.

FIG. 2 is a graph showing the input-output voltage relationship for various settings of potentiometer $R_4$. The slope of each curve constitutes a numerical index of this relationship.

It will be understood that the above analysis is based upon the circuit as illustrated in FIG. 1. A similar analysis applies to the use of an adjustable attenuating device, such as potentiometer $R_4$, in the first channel rather than in the second, i.e., in the channel opposite to that wherein amplifier $A_1$ is located. Furthermore, the attenuator can be placed in the input to amplifier $A_1$ rather than in its output circuit. It also will be understood that even greater flexibility in the multiplying factor can be achieved by using an adjustable attenuator in each channel, although two manual adjustments are then necessary to realize the full range of multiplier values.

Figure 3:
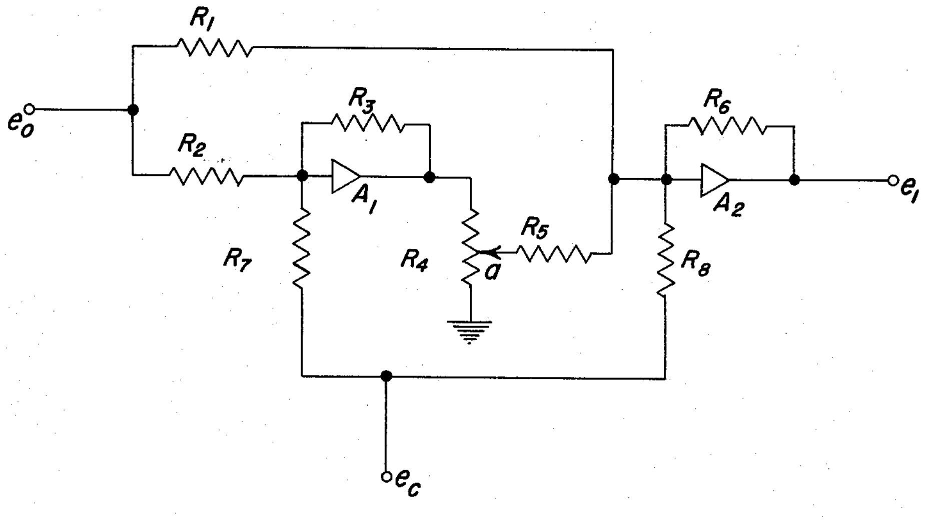
FIG. 3 is a schematic wiring diagram of an alternate embodiment of the invention.

The input voltage required to obtain zero output voltage may be altered by the application of a reference voltage $e_c$ to each of the amplifiers $A_1$ and $A_2$, as shown in FIG. 3, wherein the voltage $e_c$ is applied to these amplifiers through resistors $R_7$ and $R_8$, respectively. A particular feature of the circuit shown in FIG. 3 is that the numerical value of the multiplying factor, determined by the setting "$a$" of the potentiometer $R_4$, can be made independent of the zero output voltage point, determined by the voltage $e_c$, as may be shown by writing the equation for this circuit.

$$e_1=\left(a\frac{R_3R_6}{R_2R_5}-\frac{R_6}{R_1}\right)e_0+\left(a\frac{R_3R_6}{R_5R_7}-\frac{R_6}{R_8}\right)e_c \qquad (8)$$

and differentiating Equation 8 with respect to the variable $e_0$:

$$\frac{de_1}{de_0}=a\frac{R_3R_6}{R_2R_5}-\frac{R_6}{R_1} \qquad (9)$$

where $e_c$ is a constant.

Similarly, the zero output voltage point, determined by the value of the voltage $e_c$, can be made independent of the multiplying factor, determined by the setting "$a$" of the potentiometer $R_4$, by choosing relative values for resistors $R_1$, $R_2$, $R_7$ and $R_8$ that satisfy a particular condition. The condition may be determined by differentiating Equation 8 with respect to "$a$":

$$\frac{de_1}{da}=\left(\frac{R_3R_6}{R_2R_5}\right)e_0+\left(\frac{R_3R_6}{R_5R_7}\right)e_c \qquad (10)$$

Setting Equation 10 equal to zero to specify the condition in which output voltage is independent of the value of "$a$," and solving for the corresponding relationship between $e_0$ and $e_c$:

$$e_0=-\frac{R_2}{R_7}e_c \qquad (11)$$

Substituting Equation 11 in Equation 8 and equating $e_1$ to zero to obtain the specified condition at zero output voltage, $$-a\frac{R_2R_3R_6}{R_2R_5R_7}e_c+\frac{R_2R_6}{R_1R_7}e_c+\left(a\frac{R_3R_6}{R_5R_7}-\frac{R_6}{R_8}\right)e_c=0$$

$$\frac{R_2R_6}{R_1R_7}e_c=\frac{R_6}{R_8}e_c$$

$$\frac{R_2}{R_1}=\frac{R_7}{R_8} \qquad (12)$$

When the values of resistors $R_1$, $R_2$, $R_7$ and $R_8$ satisfy Equation 12, the input voltage which produces zero output voltage is not affected by the setting of the potentiometer $R_4$. That is, when $e_0$ is set at the value of voltage, as determined from Equation 11, which produces zero output, the output will remain at zero for any setting of potentiometer $R_4$.

Figure 4:
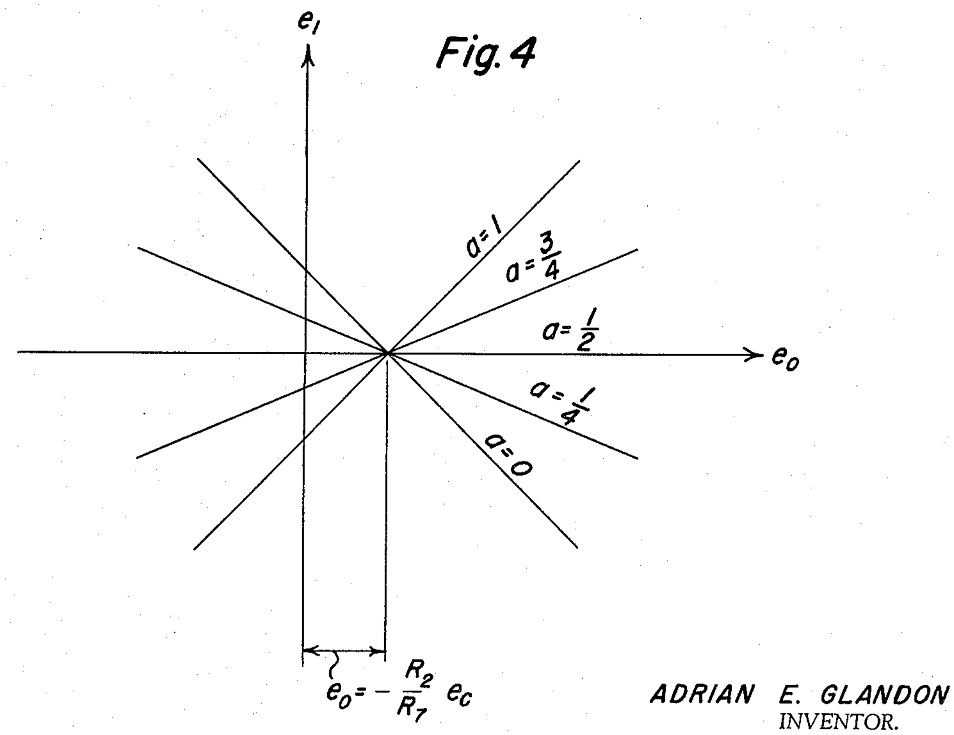
FIG. 4 is a graph illustrating the relationship between input and output voltages of the circuit shown in FIG. 3.

The effect on the input-output voltage relationship of FIG. 2, caused by an added input signal $e_c$, is shown in FIG. 4 for a circuit meeting the requirements of Equations 2 and 12. It will be seen that the entire set of curves is displaced along the axis $e_0$ by a distance representing $$-\frac{R_2}{R_7}e_c$$

or the value of input voltage necessary to produce zero output voltage.

The invention has been described in detail with particular reference to preferred embodiments thereof, but it will be understood that variations and modifications can be effected within the spirit and scope of the invention as described hereinabove and as defined in the appended claim.

I claim:

An analog multiplying circuit comprising: a circuit input terminal; an amplifier having input and output terminals; a first channel comprising a first resistor interconnecting said circuit input terminal and the input terminal of said amplifier; a second channel interconnecting said circuit input terminal and the input terminal of said amplifier, said second channel comprising in series connection a second resistor, a phase inverter and an adjustable attenuator; and means to render the input voltage to said circuit required for zero output voltage therefrom, independent of the adjustment of said attenuator, said means including a source of reference voltage; a third resistor connecting said source of said inverter; and a fourth resistor connecting said source to said amplifier, where $R_1$, $R_2$, $R_3$ and $R_4$ represent said first, second, third and fourth resistors, respectively, and where $$\frac{R_1}{R_2}=\frac{R_4}{R_3}$$

References Cited in the file of this patent

UNITED STATES PATENTS 2,401,779 Swartzel ---------------- June 11, 1946

OTHER REFERENCES

Electronic Engineering (Czajkowski), August 1956, pp. 352–355.

Proc. of the I.R.E. (Ragazzini et al.), May 1947, pp. 444–452.